United States Patent [19]

Freeman

[11] Patent Number: 4,678,628

[45] Date of Patent: Jul. 7, 1987

[54] NUCLEAR REACTOR CONTROL ROD CLUSTER FOR ENTHALPY RISE COMPENSATION

[75] Inventor: Thomas R. Freeman, Greensburg, Pa.

[73] Assignee: Westinghouse Electric Corp., Pittsburgh, Pa.

[21] Appl. No.: 835,672

[22] Filed: Mar. 3, 1986

[51] Int. Cl.[4] .............................................. G21C 7/10
[52] U.S. Cl. .................................................... 376/333
[58] Field of Search ................................. 376/333, 327

[56] References Cited

U.S. PATENT DOCUMENTS

| | | | |
|---|---|---|---|
| 3,255,086 | 6/1966 | Hitchcock | 376/333 |
| 3,713,971 | 1/1973 | Van Santen et al. | 376/333 |
| 4,169,760 | 10/1979 | Bevilacqua | 376/333 |
| 4,172,762 | 10/1979 | Anthony et al. | 376/333 |
| 4,285,769 | 8/1981 | Specker et al. | 376/333 |
| 4,326,919 | 4/1982 | Hill . | |

Primary Examiner—Harvey E. Behrend

[57] ABSTRACT

A control arrangement which provides enthalpy rise compensation upon reduction of core power includes control rodlets arranged in a cluster. Each control rod cluster has a higher axial worth at an upper portion than at a lower portion thereof. Several different embodiments of control rod clusters are provided. In one embodiment, the worth of the control rod cluster varies in accordance with different lengths of the absorber material contained within its rodlets. In another embodiment, the worth of the control rod cluster varies in accordance with different variations in densities of the absorber material within its rodlets. In a third embodiment, the worth of the control rod cluster varies in accordance with different kinds of the absorber material within the rodlets. In a final embodiment, the worth of the control rod cluster varies in accordance with different variations in diameters of the absorber material within its rodlets.

7 Claims, 9 Drawing Figures

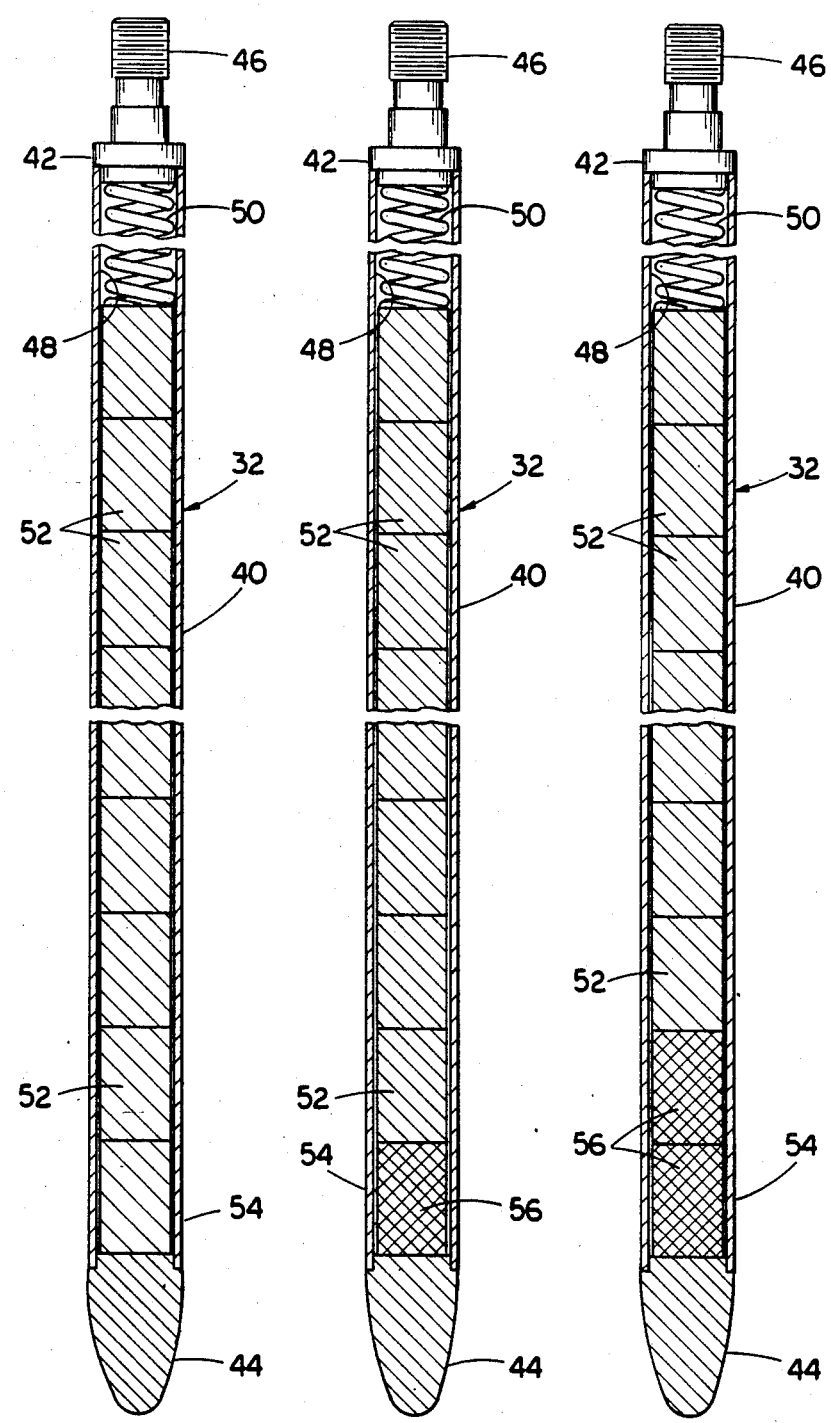

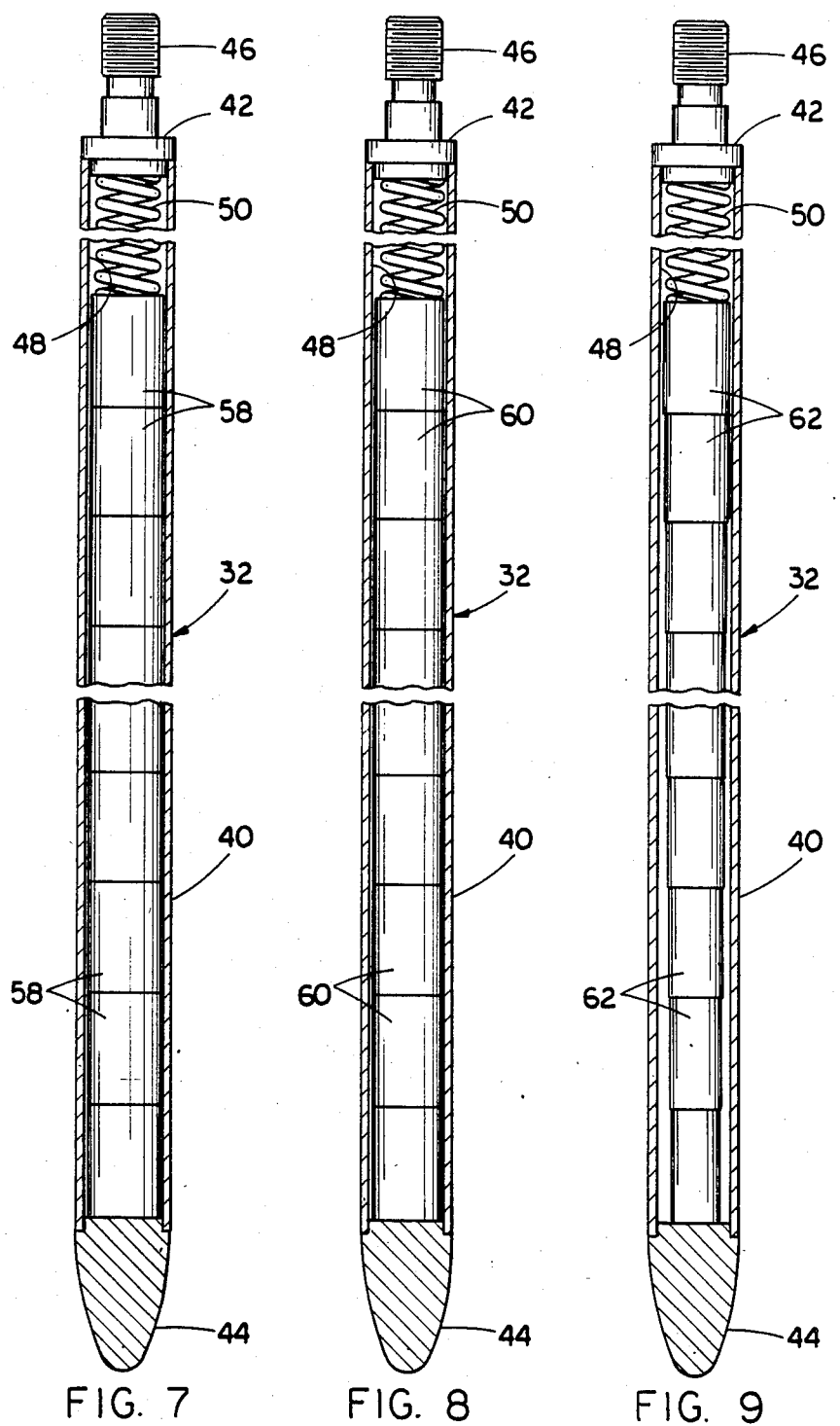

NUCLEAR REACTOR CONTROL ROD CLUSTER FOR ENTHALPY RISE COMPENSATION

CROSS REFERENCE TO RELATED APPLICATION

Reference is hereby made to the following copending U.S. applications dealing with related subject matter and assigned to the assignee of the present invention.

1. "A Nuclear Reactor Control Rod Having A Reduced Worth Tip" by John F. Wilson et al, assigned U.S. Ser. No. 633,774 and filed July 24, 1984.

2. "Light Water Moderator Rod For A Nuclear Reactor" by P. K. Doshi et al, assigned U.S. Ser. No. 654,709 and filed Sept. 26, 1984.

3. "Soluble Burnable Absorber Rod For A Nuclear Reactor" by P. K. Doshi et al, assigned U.S. Ser. No. 654,625 and filed Sept. 26, 1984.

4. "Full Length Control Rod Employing Axially Inhomogeneous Absorber Materials For Zero Reactivity Redistribution Factor" by Tho Q. Nguyen, assigned U.S. Ser. No. 763,736 and filed Aug. 8, 1985.

5. "Nuclear Reactor Control Rod With Uniformly Changeable Axial Worth" by Thomas R. Freeman, assigned U.S. Ser. No. 816,780 and filed Jan. 1, 1986.

BACKGROUND OF THE INVENTION

1. Field of the Invention

The present invention relates generally to fuel assemblies for nuclear reactors and, more particularly, is concerned with a unique control rod cluster in which the worth of the control rodlets varies axially in a manner which compensates for enthalpy rise across the core as power level changes.

2. Description of the Prior Art

In a typical nuclear reactor, such as a pressurized water type, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

One common arrangement utilizing control rods in association with a fuel assembly can be seen in U.S. Pat. No. 4,326,919 to Hill and assigned to the assignee of the present invention. This patent shows an array of control rods supported at their upper ends by a spider assembly, which in turn is connected to a control rod drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube. Generally, the neutron absorbing material is in the form of a stack of closely packed ceramic or metallic pellets which only partially fill the tube, leaving a void space or axial gap between the top of the pellets and the upper end plug in defining a plenum chamber for receiving gases generated during the control operation. A coil spring is disposed within this plenum chamber and held in a state of compression between the upper end plug and the top pellet so as to maintain the stack of pellets in their closely packed arrangement during stepping of the control rod.

Thus, control rods affect reactivity by changing direct neutron absorption. Control rods are used for fast reactivity control. A chemical shim such as boric acid dissolved in the coolant is used to control long term reactivity changes. More uniformly distributed throughout the core, the boron solution leads to a more uniform power distribution and fuel depletion than do control rods. The concentration of boron is normally decreased with core burnup or time to compensate for fuel depletion and fission product buildup.

A pressurized water nuclear reactor (PWR) operating at full power with no control rods inserted into the fuel assemblies in its core will operate near zero axial offset. If this is not initially true, as burnup progresses, it will be. Also, during full power operation, the coolant density decreases with core height as heat is carried away from the fuel rods. However, if power is then reduced by increasing dissolved boron concentration or some other uniform poison change, the power will swing to the top of the core. The reason this happens is because, as power is reduced, the enthalpy rise across the core is reduced. (A rise in enthalpy refers to the rise in heat content of the water as its temperature rises). Thus, the coolant (or water) density change across the core is reduced which reduces the difference in reactivity between the bottom and top of the core. Relative to the bottom of the core, the top becomes more reactive since the water density is increasing there relative to the bottom. This causes power to shift to the top of the core.

One solution to this problem is to insert the control rods of the aforementioned conventional design, instead of changing the boron concentration, to change power level. Since the control rods enter the core from the top in the PWR, they will tend to drive the power to the bottom of the core and thus they will tend to compensate for the tendency of the power to swing to the top of the core at reduced power. While use of conventional control rods makes changes in the power level possible without large swings in axial offset, the increases in axial peaking factor during power changes demonstrates that use of this method is not problem-free.

Consequently, a need exists for improvements in enthalpy rise compensation, which will effectively resolve the problem of skewing reactivity toward the core top but which will not raise a host of new problems in the process.

SUMMARY OF THE INVENTION

The present invention provides a unique control rod cluster designed to satisfy the aforementioned needs. It is well known that as power is reduced several phenomenon occur. First, the relative axial water (or coolant) density distribution and its associated reactivity is changed because of the change in enthalpy rise as described above. Second, the axial Doppler defect reactivity changes because the absolute axial power is changing as well as perhaps the axial power shape. Third, the reactivity tied up in xenon is changing as power level changes both in absolute terms and spacially.

However, underlying the present invention is the observation that if the axial offset is held constant, then neither the Doppler nor xenon defect reactivity changes in relative magnitude in the axial dimension. Both the reactivity change in the Doppler and xenon defects will remain approximately symmetric from bottom to top. Only the coolant or water density effect will be non-symmetric. Thus, if the water density effect can be compensated for, then the resultant reactivity changes in Doppler and xenon will be symmetric and can then be compensated for by changing the dissolved boron concentration or some other uniform poison control. It follows that if the water density change can be handled adequately, then any change in axial offset or axial power distribution will be slight.

The solution provided by the present invention is to tailor the axial distribution of control rod worth in the PWR control rod cluster to match the axial shape of the reactivity associated with the enthalpy rise. The latter increases approximately linearly with core height because the water density decreases approximately linearly. Actually,, to be precise, the reactivity increase follows a modified linear curve tending toward a somewhat S-shape since the water density decreases slowly at the bottom of the core where there is little power being generated, then the water density decreases faster in the middle of the core where maximum power is being generated and finally decreases slowly again at the top of the core where again little power is being generated. However, herein it will be understood that the phrase "approximately linearly" includes the slight S-shape configuration of the reactivity and coolant density change curves.

Thus, since the solution is to match the control rod cluster worth to compensate for water density and reactivity change, cluster worth should increase approximately linearly with core height. If the worth of the cluster is chosen properly, there would be no relative change in core reactivity as a function of height when the cluster has been inserted to reduce core power. Therefore, there would be no change in axial offset when the cluster is inserted to reduce power. Such a control rod cluster would cancel the axial reactivity change caused by an enthalpy rise change.

Accordingly, the present invention is directed to a control arrangement for use with a nuclear fuel assembly having a plurality of guide thimbles to provide enthalpy rise compensation, comprising: (a) a spider assembly; and (b) a plurality of control rods containing neutron absorber material, being supported at their upper ends from the spider assembly in a pattern which matches that of the guide thimbles and extending generally parallel to one another downwardly therefrom for insertion into the guide thimbles of the fuel assembly. Each of the control rodlets has a higher axial worth at an upper portion than at a lower portion of the control rod.

Several different embodiments of control rod clusters are provided by the present invention. In a first embodiment, the worth of the control rod cluster varies axially in accordance with different lengths of the absorber material contained within the rodlets. The absorber material is in the form of pellets of generally the same height. The absorber material in each control rodlet is different in length than the absorber material in any other control rodlet with each rodlet having progressively longer absorber stack length. In a second embodiment, the worth of the control rod cluster varies in accordance with different variations in densities of the absorber material contained within the rodlets. In a third embodiment, the worth of the control rod cluster varies in accordance with the different kinds of the absorber material contained within the rodlets. Finally, in a fourth embodiment, the worth of the control rod cluster varies in accordance with different variations in diameters of the absorber material contained within the rodlets.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged, vertically foreshortened, sectional view of one of the control rodlets of the cluster of FIGS. 2 and 3, having absorber in pellet form extending down to its bottom end plug.

FIG. 5 is an enlarged, vertically foreshortened, sectional view of another rodlet of FIGS. 2 and 3, having absorber which is shorter in length than that of the control rodlet of FIG. 4 by a height which will give the whole cluster a worth which varies approximately linearily in the axial direction.

FIG. 6 is an enlarged, vertically foreshortened, sectional view of still another of the control rodlets of the cluster of FIGS. 2 and 3, having absorber which is still shorter in length than that of the control rodlet of FIG. 5.

FIG. 7 is an enlarged, vertically foreshortened, sectional view of a control rodlet from a cluster thereof which constitute a second embodiment in which their worths vary in accordance with different variations of absorber densities.

FIG. 8 is an enlarged, vertically foreshortened, sectional view of a control rodlet from a cluster thereof which constitute a third embodiment in which their worths vary in accordance with different kinds of absorber material.

FIG. 9 is an enlarged, vertically foreshortened, sectional view of a control rodlet from a cluster thereof which constitute a fourth embodiment in which their worths vary in accordance with different variations of absorber diameters.

DETAILED DESCRIPTION OF THE INVENTION

Figure 1:
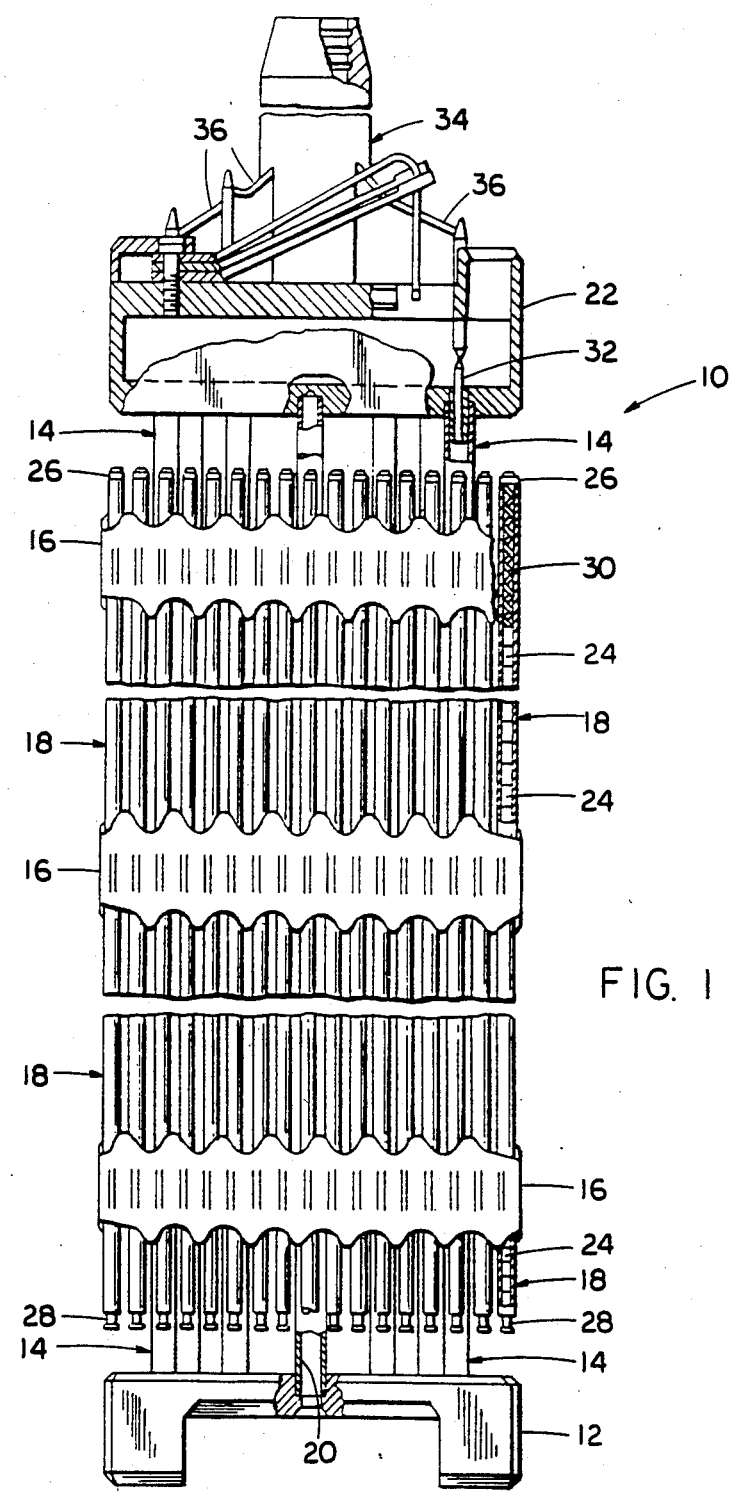
FIG. 1 is a side elevational view, with parts partially sectioned and broken away for purposes of clarity, of a fuel assembly having a spider assembly disposed above the fuel assembly and supporting a control rod cluster extending down through the guide thimbles of the fuel assembly, the cluster being constructed in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a nuclear reactor fuel assembly, represented in vertically foreshortened form and being generally designated by the numeral 10. Being the type used in a PWR, the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

IMPROVED CONTROL ROD CLUSTER

Figure 2:
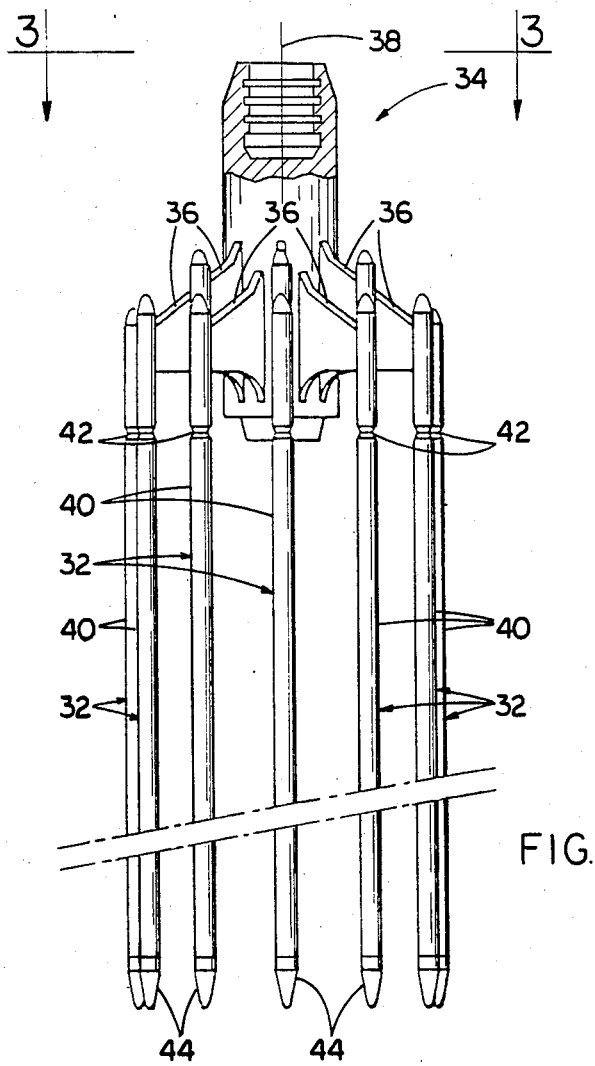
FIG. 2 is an elevational view of the spider assembly and attached control rod cluster, being removed from the fuel assembly of FIG. 1.
Figure 3:
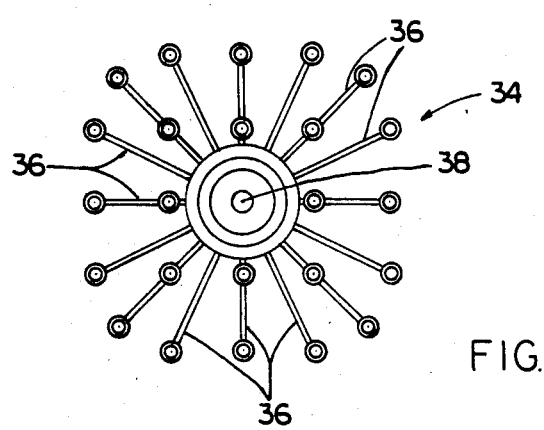
FIG. 3 is a top plan view of the spider assembly and control rod cluster as seen along line 3—3 of FIG. 2.

Turning now to FIGS. 2 and 3, there is shown the control arrangement which includes a control rod cluster, being generally designated 32 and constructed in accordance with the present invention, which can be used in some of the fuel assemblies 10 of the reactor core to reduce core power when desired and to compensate for the occurrence of enthalpy rise across the core due to the reduction in reactivity of the core by insertion of the control rodlets of the cluster 32. As will become clear, the control rod cluster 32 constitutes means which compensates for reactivity increase in the upper region of the core relative to the lower region thereof in a manner which results in no relative change in core reactivity as a function of height when the rodlets 32 are inserted to reduce core power.

The control rodlets 32 in the cluster of the present invention are supported by a conventional spider assembly, generally indicated by the numeral 34, having radially extending flukes 36 connected to the upper ends of the control rods 32. The control rodlets 32 extend downwardly from the spider assembly 34 and generally parallel to one another. The rodlets 32 are arranged in a pattern matched to that of the guide thimbles which adapts them to be inserted through the top nozzle 22 and downward through the guide thimbles 14 of the PWR fuel assembly 10. The spider assembly 34 is connected to a control mechanism (not shown) which is operable in a known manner to move the control rodlets 32 in and out of the guide thimbles 14 so as to regulate core power and compensate for the enthalpy rise.

More particularly, the control rodlets 32 arranged in the cluster are composed of a plurality of rodlets which differ in the length of control material contained therein. These lengths are chosen so that the control rod cluster as a whole has a higher axial worth at an upper portion than at a lower portion thereof.

In FIGS. 4 to 6, 7, 8 and 9, there is respectively seen the four different embodiments of control rod clusters 32 provided by the present invention. The control rods of all cluster embodiments have certain basic parts in common. For instance, each control rod 32 is of the same overal length and includes an elongated, thin-walled metallic tube 40 and means in the form of respective upper and lower end plugs 42,44 for closing or sealing the opposite ends of the tube 40. Preferably, the rod tube 40 is stainless steel having a constant diameter. The upper end plug 42 has an upwardly extending integrally formed stem section with an externally threaded end 46 for connection to one radial fluke 36 of the spider assembly 34 in a conventional manner. The lower end plug 44 is cone-shaped. Slidably disposed within the tube 40 and resting on the lower end plug 44 is a stack of closely packed neutron absorber pellets (the specific arrangement, configuration and characteristics thereof to be described shortly hereafter) which only partially fill the tube 40, leaving a void space or axial gap between the top of the pellets and the upper end plug 42 in defining a plenum chamber 48 for receiving gases generated during the control operation. As conventional, a coil spring 50 is disposed within this plenum chamber 48 and held in a state of compression between the upper end plug 42 and the top pellet to thereby maintain the stack of pellets in their closely packed arrangement during movement of the control rod cluster 32.

As stated above, the control rodlet 32 contains a stack or plurality of pellets arranged in an end-to-end relationship. It is with respect to the pellets that the four embodiments of control rod clusters are different. In the first embodiment of FIGS. 4 to 6, the pellets 52 are composed of the same absorber material, such as B4C, Ag-In-Cd, or H$_f$, and are of generally the same height, for example six inches. The basic characteristic of the control rodlets 32 of the first cluster embodiment is that the worth of the control rod cluster varies axially in accordance with different lengths of the absorber material contained within the rodlets 32. The absorber material in one control rodlet 32 is shorter in length (the total length of the pellet stack) than the absorber material in another control rodlet at the lower portions 54 of the control rodlets and by the height of one absorber pellet 52. For example, it can be seen that the control rodlet 32 in FIG. 6, has an absorber length shorter by the height of one pellet 52 in view that it contains two inert pellets 56 compared to the one contained in control rodlet 32 of FIG. 5. Likewise, control rodlet 32 in FIG. 5, has an absorber length shorter by the height of one pellet 52 in view that it contains one inert pellet 56 compared to none in control rodlet 32 of FIG. 4.

In the second embodiment of FIG. 7, the pellets 58 are composed of the same absorber material and are of generally the same height as in the first embodiment. The basic characteristic of the control rodlets 32 of the second cluster embodiment is that the worth of the control rod cluster varies in accordance with different variations in densities of the absorber material contained within the rodlets. In any given control rodlet 32, the densities of the pellets 58 increase from bottom to top of the stack thereof, preferably in a generally linear relationship as a function of core height. The average density of control rodlet 32 is greater at the top of the cluster than at the bottom thereof.

In the third embodiment of FIG. 8, again the pellets 58 are of generally the same height as in the first embodiment. However, here the basic characteristic of the control rodlets 32 of the third cluster embodiment is that the worth of the control rod cluster varies in accordance with different kinds of the absorber material contained within the rodlets. Different kinds of absorber can be weak absorber like stainless steel near the bottom and strong absorber like H$_f$ at the top of the cluster. In any given control rodlet 32, the strength of the absorber material in the pellets 60 increase from bottom to top of the stack thereof, preferably in a generally linear relationship as a function of core height. The average strength of absorber material in the control rodlets 32 is greater at the top than at the bottom. Strengths can be increased by, for instance, increasing the B-10 enrichment of B$_4$C axially.

Finally, in the fourth embodiment of FIG. 9, the pellets 62 have the same axial heights and absorber material. However, the basic characteristic of the control rodlets 32 of the fourth cluster embodiment is that the worth of the control rod cluster varies in accordance with different variations in diameters of the absorber pellets 62 contained within the rodlets. In any given control rodlet 32, the diameters of the pellets 62 increase from bottom to top of the stack thereof, preferably in a generally linear relationship as a function of core height.

It should also be understood that achievement of increasing control rod cluster worth as a function of core height may use a combination of the above characteristics of the various embodiments.

The total rod cluster worth required for these enthalpy rise compensating control rodlets 32 is about 0.5% ΔK. This requirement is established as follows. At EOL (end of core life) the moderator temperature coefficient (MTC) is about −30 pcm/°F. in a PWR. The temperature increase across the core is typically 70° F. at full power. The difference in reactivity due to the enthalpy rise between the top and bottom of the core at EOL (end of core life) is, therefore, about 2% ΔK at full power. To go to 50% power at EOL a difference of 1% ΔK would have to be compensated for. If the worth of this rod cluster increases linearly starting from zero worth, then the average worth of the rod cluster would be about 0.5% ΔK.

Since the required worth would be less earlier in life and reductions below 50% power near EOL are unlikely because xenon buildup would prevent return to full power, it is expected that the enthalpy rise compensating rods 32 would not need to be worth more than 0.5% ΔK.

It is also noted that these rods will have to have significantly less worth near BOL (beginning of core life). Here the MTC is less than −10 pcm/°F. so a worth as low as 0.1% ΔK may be necessary. Lighter banks at BOL are necessary because the enthalpy rise rods need to be approximately fully inserted to work properly. For instance, at BOL a 0.5% ΔK rod bank would only be inserted about one-third of the way into the core. This may be better than conventional control rods but not nearly as effective as a fully inserted control rod cluster 32 which at each elevation of the core compensates for the core enthalpy rise change exactly.

This observation is not a problem since several light banks can be used. As an example, banks of 0.1% ΔK, 0.2% ΔK and 0.2% ΔK would produce worths up to 0.5% ΔK in steps of 0.1% ΔK depending on which banks are inserted. Thus, at any core burnup a set of rods can be selected which when approximately fully inserted, would compensate for enthalpy rise changes. The reasons this is true is that the rods are not overlapped and when fully inserted, the rod cluster worths are additive.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A control arrangement for use with a nuclear fuel assembly having a plurality of guide thimbles to provide enthalpy rise compensation, comprising:
   (a) a spider assembly; and
   (b) a plurality of control rodlets containing neutron absorber material, being supported at their upper ends from said spider assembly in a pattern which matches that of said guide thimbles and extending generally parallel to one another downwardly therefrom for insertion into said guide thimbles of said fuel assembly;
   (c) said control rodlets being arranged in a cluster having a higher axial neutron absorption capability at an upper portion than at a lower portion thereof; said each control rodlet varying in axial neutron absorption capability from every other rodlet.

2. The control arrangement as recited in claim 1, wherein said neutron absorption capability of said control rod cluster varies in accordance with different lengths of said absorber material contained within said rodlets thereof.

3. The control arrangement as recited in claim 2, wherein said absorber material is in the form of pellets of generally the same heights.

4. The control arrangement as recited in claim 3, wherein said absorber material in each control rodlet is different in length than said absorber material in any other control rodlet.

5. The control arrangement as recited in claim 1, wherein said neutron absorption capability of said control rod cluster varies in accordance with different variations in densities of said absorber material contained within said rodlets thereof.

6. The control arrangement as recited in claim 1, wherein said neutron absorption capability of said control rod cluster varies in accordance with different kinds of said absorber material contained within said rodlets thereof.

7. The control arrangement as recited in claim 1, wherein said neutron absorption capability of said control rod cluster varies in accordance with different variations in diameters of said absorber material contained within said rodlets thereof.

* * * * *